United States Patent
Kennedy et al.

(10) Patent No.: US 9,587,069 B2
(45) Date of Patent: Mar. 7, 2017

(54) POLYISOBUTYLENE-BASED POLYURETHANES CONTAINING ORGANICALLY MODIFIED MONTMORILLONITE

(71) Applicant: The University of Akron, Akron, OH (US)

(72) Inventors: Joseph Kennedy, Akron, OH (US); Nihan Nugay, Bebek Istanbul (TR); Turgut Nugay, Istanbul (TR)

(73) Assignee: The University of Akron, Akron, OH (US)

( * ) Notice: Subject to any disclaimer, the term of this patent is extended or adjusted under 35 U.S.C. 154(b) by 30 days.

(21) Appl. No.: 14/415,318

(22) PCT Filed: Jul. 23, 2013

(86) PCT No.: PCT/US2013/051634
§ 371 (c)(1),
(2) Date: Jan. 16, 2015

(87) PCT Pub. No.: WO2014/018509
PCT Pub. Date: Jan. 30, 2014

(65) Prior Publication Data
US 2015/0191566 A1    Jul. 9, 2015

Related U.S. Application Data

(60) Provisional application No. 61/674,593, filed on Jul. 23, 2012.

(51) Int. Cl.
*C08G 18/38* (2006.01)
*C08K 9/04* (2006.01)
*C08G 18/48* (2006.01)
*C08G 18/62* (2006.01)
*C08G 18/73* (2006.01)
*C08G 18/83* (2006.01)
(Continued)

(52) U.S. Cl.
CPC ......... *C08G 18/3895* (2013.01); *C08G 18/10* (2013.01); *C08G 18/12* (2013.01); *C08G 18/4825* (2013.01); *C08G 18/4854* (2013.01); *C08G 18/5024* (2013.01); *C08G 18/6204* (2013.01); *C08G 18/73* (2013.01); *C08G 18/831* (2013.01); *C08K 9/04* (2013.01)

(58) Field of Classification Search
CPC . C08G 18/4854; C08G 18/5024; C08G 18/10
USPC ....................................................... 525/459
See application file for complete search history.

(56) References Cited

U.S. PATENT DOCUMENTS 5,421,876 A    6/1995  Janoski
2003/0093107 A1    5/2003  Parsonage et al.
(Continued)

*Primary Examiner* — Mike M Dollinger
(74) *Attorney, Agent, or Firm* — Renner Kenner Greive Bobak Taylor & Weber

(57) ABSTRACT

The present invention generally relates to polyurethanes and polyurethane prepolymers having improved mechanical properties over ordinarily produced polyurethanes or polyurethane prepolymers. Such polyurethanes and prepolymers include very small amounts of organically-modified layered clays, and more specifically, less than 1 weight percent, based upon the total polymer composition, of a layered clay exfoliated with organic quaternary ammonium salts having alkyl substituents, wherein at least one of the alkyl substituents carries an —NH2 group.

23 Claims, 11 Drawing Sheets

(51) Int. Cl.
*C08G 18/50* (2006.01)
*C08G 18/10* (2006.01)
*C08G 18/12* (2006.01)

(56) References Cited

U.S. PATENT DOCUMENTS

| | | | |
|---|---|---|---|
| 2005/0137288 A1* | 6/2005 | Maruo | C09C 1/42 |
| | | | 523/216 |
| 2007/0072991 A1 | 3/2007 | Jana et al. | |
| 2007/0249754 A1 | 10/2007 | Lyu et al. | |
| 2008/0281016 A1 | 11/2008 | Martin | |
| 2009/0036445 A1* | 2/2009 | Bonjouklian | C07D 471/04 |
| | | | 514/234.2 |
| 2009/0326132 A1 | 12/2009 | Lin et al. | |
| 2010/0023104 A1* | 1/2010 | Desai | A61L 27/18 |
| | | | 607/119 |

* cited by examiner

POLYISOBUTYLENE-BASED POLYURETHANES CONTAINING ORGANICALLY MODIFIED MONTMORILLONITE

RELATED APPLICATION DATA

This patent application claims the benefit of U.S. Provisional Patent Application No. 61/674,593, filed on Jul. 23, 2012, entitled "Minute Amounts of Organically-Modified Montmorillonite Improves the Properties of PIB-Based Polyurethanes" the entirety of which is hereby incorporated by reference herein.

FIELD OF THE INVENTION

The present invention generally relates to novel polyurethane prepolymers and polyurethanes. More particularly, the polyurethane prepolymers and polyurethanes include a very small amount, i.e., less than 1 weight percent based upon the total polymer composition, of a layered clay exfoliated with organic quaternary ammonium salts having alkyl substituents, wherein at least one of the alkyl substituents carries an —$NH_2$ group. Such a layered clay may be organically-modified montmorillonite, among others.

BACKGROUND OF THE INVENTION

It is known that some properties of many kinds of polymers (e.g., various rubbers, polyesters, polystyrenes, polyepoxides, etc.) can be enhanced, and their costs reduced, by the addition of various inexpensive layered silicates or clays, such as montmorillonite (MMT). However, there are issues of compatibility between the use of such polymers and these polar inorganic solids. Thus, it is known in the art to modify these polar inorganic solids with organic chemicals to enhance their compatibility with organic polymers, and hence, to obtain composites with improved properties.

Among the advances in organically-modifying these inorganic solids are the use of quaternary ammonium cations having a relatively long hydrocarbon substituent (e.g., $^+NR_3$—$C_{16}$). These cations are particularly well suited for use as swelling agents and modifiers of MMT. The —$NR_3^+$ function of the modifier cation becomes ionically bound to the clay, disrupts its layered structure, and thus enables the entry (intercalation) of polymers in-between the clay's layers (galleries). The relatively long hydrocarbon substituent of the modifier renders the clay essentially organophilic and enhances the compatibility of the clay with synthetic polymers such as those above. Exfoliation occurs when the layers of the clay are essentially completely disrupted and the individual layers separate.

Blends of layered clays with polymers are often termed "nanocomposites" because at least one of the dimensions of the clay's layers is in the nanometer dimension. The properties of such nanocomposites are often superior to the virgin polymer. Considerable research and development is being carried out toward the preparation, characterization and testing of such nanocomposites.

Shuo et al., *J. Appl. Polym. Sci.*, 94, 534, (2004) alleges the preparation of polyurethane nanocomposites by the use of an organically-modified montmorillonite (OmMMT). The MMT is modified by 1,6-hexamethylene diamine ($NH_2$—$(CH_2)_6$—$NH_2$). The reference discloses that this OmMMT is used as a chain extender to replace part of the conventional 1,2-propane diamine ($NH_2$—$CH_2CH(NH_2)CH_3$) chain extender for the preparation of polyurethanes. Shuo et al. dissolves the $NH_2$—$(CH_2)_6$—$NH_2$ in aqueous HCl and assumed that the quaternary head group of the $^+NH_3$—$(CH_2)_6$—$NH_2$ so formed becomes (a) electrostatically attached to the negatively charged $MMT^-$, and (b) will also react with an isocyanate groups to produce a urea linkage: $MMT^-$-$NH_2$+—$CONH$—. They further postulated that the (non-quaternized) —$NH_2$ end group reacts with another isocyanate group and yields a further urea linkage: —NH—CO—NH—. In other words, Shuo et al. regard their OmMMT as a MMT-tethered chain extender. The authors illustrated their proposition with chemical equations (see Scheme 2 in the Shuo et al. reference). However, this proposition is flawed because the relatively highly acidic —$NH_3^+$ will preferentially protonate the basic —SiO— sites in the MMT (—$NH_3^+$+—SiO—═—$NH_2$+—$SiOH^+$—) and the ionic attachment between the modifier and MMT will diminish if it will occur at all (i.e., the organic amine will likely not be bound to the MMT). Indeed, Shuo et al. recovered polymer by solvent extraction from their nanocomposite, which indicates a lack of attachment between the MMT and their modifier. Further, Shuo et al. fails to demonstrate direct attachment between the MMT and the modifier, for example, by spectroscopic analysis or other means.

Tien and Wei, *Macromolecules*, 34, 9045, (2001) employs a similar strategy to enhance the properties of polyurethanes. In that reference, Tien and Wei quaternized mono-, di-, and tri-hydroxyl amino alcohols (3-amino-1-propanol, 3-amino-1,2-propane diol, and tris(hydroxymethyl) amino methane) with HCl, and used these quaternized amines as swelling (exfoliating) agents with MMT. The —$NH_3^+$ groups were assumed to be ionically connected to the MMT and the free —OH groups to react with isocyanates. However, in these systems, just as with Shou et al.'s systems (see above), the —$NH_3^+$ will preferentially protonate the basic —SiO— sites in MMT, which will severely diminish if not altogether eliminate the ionic linkage between the modifier and MMT.

Thus, there is a need in the art for the production of polyurethane nanocomposites that uses organically-modified MMT or other layered clays to improve the mechanical properties of the polyurethanes.

SUMMARY OF THE INVENTION

The present invention generally relates to polyurethanes or polyurethane prepolymers having improved mechanical properties over ordinarily produced polyurethanes or polyurethane prepolymers. It will be appreciated that the generally recognized understanding of the term "polyurethanes" is inclusive of polyurethanes, polyureas, and polyurethane/polyureas. Thus, throughout this disclosure, where the term "polyurethane(s)" is used, it will be with this recognition that the term includes all three of these sub-groups, unless it is clear that the sub-group polyurethane is being discussed. The sub-group polyurethane will be understood to be associated with the use of a diol with diisocyanate. The sub-group polyurea will be understood to be associated with the use of a diamine with a diisocyanate. And the sub-group of polyurethane/polyurea will be associated with the combination of an —OH group and a —$NH_2$ group. It will also be appreciated that the term "polyurethane" in its generally recognized form will include polyurethane nanocomposites based upon the definition of the term "nanocomposites" as described hereinabove.

The term "prepolymer" refers to the production of a shorter chain composition having a definitive number of mer units that does not include any chain extenders in the reaction product. That is, there are essentially two options for producing the polyurethanes of the present invention. First, one can prepare the prepolymer and then react the chain extender with the prepolymer to form the polyurethane as a two-step method. Given that the present invention envisions a stoichiometric excess of diisocyanate, the diisocyanate groups will be provided on the ends of the prepolymer and will enable the chain extenders to react with the one or more of the isocyanate end groups. Or second, one can include the chain extender during the initial polymer reaction such that the polyurethane is produced in a one step method. Again, given the stoichiometric excess of diisocyanate, the diol/diamine will react with some of the isocyanates available, the —$NH_2$ end group of the OmMMT will react with some of the isocyanates available, and the chain extender will react with some the isocyanates available.

The novel polyurethanes and polyurethane prepolymers of the present invention include organically-modified layered clays such as OmMMT. It has been found that layered clay such as MMT can be swelled and ultimately exfoliated with organic quaternary ammonium salts in which at least one of the longer alkyl substituents carries an —$NH_2$ group. One example of such a organic quaternary ammonium salt is trimethyl-1-propyl amine ammonium iodide, $I^{-+}N(CH_3)_3$—$CH_2CH_2CH_2$—$NH_2$. By the use of this and similar salts, electrostatic attachment between the —$NR_3^+$ and MMT, or other layered clay will occur, while the free —$NH_2$ group will react with isocyanates during polyurethane synthesis. In contrast to the highly acidic —$NH_3^+$ group, the much less acidic organic —$NR_3^+$ group does not alkylate —$SiO$— in the layered clay or MMT, and will become ionically bound to layered clay or MMT. Thus, these organically-modified MMTs will act as chain extenders, and the exfoliated MMT layers will become integral parts of the polyurethane molecule. The electrostatically-bound MMT in the polyurethane will impart significantly enhanced properties of the polyurethane nanocomposite.

In one embodiment, the present invention relates to a polyurethane prepolymer comprising the reaction product of a diol and/or a diamine, a stoichiometric excess amount of diisocyanate, and less than 1 percent by weight based upon the total polymer composition, of a layered day exfoliated with organic quaternary ammonium salts having alkyl substituents, wherein at least one of the alkyl substituents carries an —$NH_2$ group.

In another embodiment, the present invention relates to a polyurethane comprising the reaction product of the polyurethane prepolymer as set forth above and a chain extender.

In yet another embodiment, of the present invention relates to a polyurethane comprising the reaction product of a diol and/or a diamine; a stoichiometric excess amount of diisocyanate; less than 1 weight percent, based upon the total polymer composition, of a layered clay exfoliated with organic quaternary ammonium salts having alkyl substituents, wherein at least one of the alkyl substituents carries an —$NH_2$ group; and a chain extender.

In any of the embodiments above, the diol may be selected from the group consisting of HO-PIB-OH and HO-PTMO-OH, wherein each diol has a molecular weight of at least 1000 g/mol.

In any of the embodiments above, the diamine may be selected from the group consisting of $H_2N$-PIB-$NH_2$ and $H_2N$-PTMO-$NH_2$, wherein each diamine has a molecular weight of at least 1000 g/mol.

In any of the embodiments above, the diisocyanate may be selected from the group consisting of 4,4'-methylene diphenyl diisocyanate (MDI) and/or 4,4'-methylene dicyclohexyl diisocyanate (HMDI).

In any of the embodiments above, the layered clay may be selected from any 2:1 phyllosilicates-smectite group consisting of montmorillonite, beidellite, nontronite, saponite, (F-)hectorite, stevensite, vermiculite, paragonite, clinochlore and thuringite.

Where a chain extender is used in any of the embodiments above, the chain extender may be selected from the group consisting of HDO, BDO, HDA and a hydrogen-accepting chain extender (HACE).

Notably, it has been found that polyurethanes that include the small amount of organically-modified layered clays have improved mechanical properties such as increased tensile, elongation and/or toughness as compared to a polyurethane comprising the reaction product of a diol and/or a diamine, and a diisocyanate without any modified layered clay. With such improved mechanical properties, these polyurethanes are seen as being particularly suitable for use in the production of medical devices, given that they are stronger and tougher than unadulterated virgin polyurethanes.

DETAILED DESCRIPTION OF THE INVENTION

Figure 1:
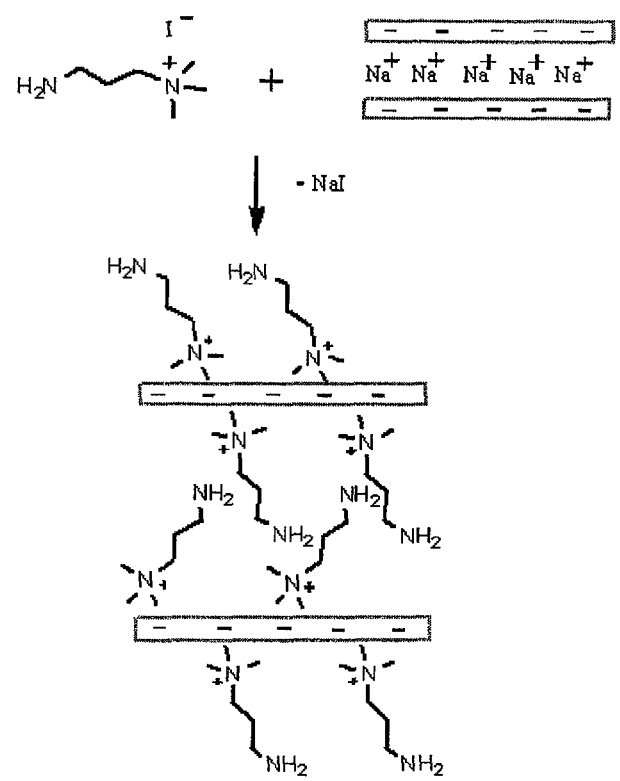
FIG. 1 is a schematic representation of the insertion of one type of modifying organic quaternary ammonium salt ($I^{-+}$ $N(CH_3)_3$—$CH_2CH_2CH_2$—$NH_2$) into the galleries of layered clays (e.g., MMT), wherein the negatively charged oblong boxes are the layered clays.

The present invention generally relates to the production of polyurethanes or polyurethane prepolymers containing very small amounts of organically-modified layered clays, such as organically-modified montmorillonite (OmMMT), to produce optically clear polyurethane films with greatly improved properties relative to those of unadulterated virgin polyurethane. Such polyurethanes are believed to be particularly suited for use in medical devices.

In one embodiment, polyurethane prepolymers may be made from the reaction product of a diol and a stoichiometric excess of diisocyanate, together with less than 1 weight percent, based upon the total polymer composition, of a layered clay exfoliated with organic quaternary ammonium salts having alkyl substituents, wherein at least one of the alkyl substituents carries an —$NH_2$ group. Any diol known and used in the art for the production of polyurethane may be used. Examples of such diols include PIB-based diols, such as HO-PIB-OH, or HO-PTMO-OH, or combinations of the two. In one embodiment, each diol has a molecular weight of at least 750 g/mol and more particularly, at least 1000 g/mol.

In another embodiment, polyurethane prepolymers may be made from the reaction product of a diamine and a stoichiometric excess of diisocyanate, together with less than 1 weight percent, based upon the total polymer composition, of a layered clay exfoliated with organic quaternary ammonium salts having alkyl substituents, wherein at least one of the alkyl substituents carries an —$NH_2$ group. Any diamine known and used in the art for the production of polyureas may be used. Examples of such diamines include PIB-based diamines such as $H_2N$-PIB-$NH_2$, or $H_2N$-PTMO-$NH_2$ or combinations of the two. In one embodiment, each diamine has a molecular weight of at least 750 g/mol and more particularly, at least 1000 g/mol.

In another embodiment, polyurethane prepolymers may be made from the reaction product of a diamine and a diol and a stoichiometric excess of diisocyanate, together with less than 1 weight percent, based upon the total polymer composition, of a layered clay exfoliated with organic quaternary ammonium salts having alkyl substituents, wherein at least one of the alkyl substituents carries an —$NH_2$ group. Any compound having a diamine and a diol known and used in the art in the production of polyurethane/polyureas may be used. Examples of such diamines and diols include PIB-based compounds such as HO-PIB-$NH_2$, or HO-PTMO-$NH_2$ or combinations of the two. In one embodiment, each diamine/diol compound has a molecular weight of at least 750 g/mol and more particularly, at least 1000 g/mol.

In all three main embodiments above, the polyurethane prepolymer includes a stoichiometric excess of diisocyanate. That is, the molar ratio of diol/diamine to diisocyanate should be such that a little more diisocyanate is provided and remains in excess so as to ensure that the diisocyanates are left on the ends of the prepolymer. Any diisocyanate known and used in the art in the production of polyurethanes may be used. Examples of such diisocyanates include 4,4'-methylene diphenyl diisocyanate (MDI) and/or 4,4'-methylene dicyclohexyl diisocyanate (HMDI). Again, a stoichiometric excess of diisocyanate is used. However, typically and in one embodiment, from about 50 to about 25 weight percent, based upon the total polymer composition, of diisocyanate is used, while from about 50 to about 75 weight percent, based upon the total polymer composition, of diol, diamine or amine/alcohol end group compound is used. In other embodiments from about 35 to about 48 weight percent, based upon the total polymer composition, of diisocyanate is used, while from about 52 to about 65 weight percent, based upon the total polymer composition, of diol, diamine or amine/alcohol end group compound is used.

In all three embodiments related to the production of the polyurethane prepolymer, a layered clay is used. The layered clay can be any layered clays known and used in the art that is suitable and known for increasing the mechanical properties of polymers, namely polyurethanes. Such layered clays can include 2:1 phyllosilicates-smectite groups. In one embodiment, the layered clays may be selected from montmorillonite, beidellite, nontronite, saponite, (F-)hectorite, stevensite, vermiculite, paragonite, clinochlore and thuringite. In another embodiment, the layered clay is montmorillonite.

In all three embodiments above, the layered clays are organically modified. That is, the layer clay is swelled and ultimately exfoliated with organic quaternary ammonium salts in which at least one of the longer alkyl substituents has an —$NH_2$ group, preferably an end group. One example of such an organic quaternary ammonium salt is trimethyl-1-propyl amine ammonium iodide. In one embodiment, the —$NH_2$ group is a primary amine. In another embodiment, the —$NH_2$ group is a secondary amine. In one embodiment, the longest alkyl substituent has from 4 to 10 carbon atoms. In another embodiment, the longest alkyl substituent may be straight, branched, or cyclic. In other embodiments, the shortest of the alkyl substituents have 1 to 4 carbon atoms. It will be appreciated that the organic quaternary ammonium salts are ionically or electrostatically bonded to the layered clays, since the clays are negatively charged and the salts are positively charged at the —$NR_3^+$ functionalities. In one or more embodiments, the layered clays are nanoclays, meaning that one dimension of the clay is in the nano range.

In one embodiment, from 0.001 to 0.9 weight percent of layered clay exfoliated with organic quaternary ammonium salts having alkyl substituents, wherein at least one of the alkyl substituents carries an —$NH_2$ group, is used. In another embodiment, from 0.01 to 0.8 weight percent of layered clay exfoliated with organic quaternary ammonium salts having alkyl substituents, wherein at least one of the alkyl substituents carries an —$NH_2$ group, is used. In yet another embodiment, from 0.1 to 0.7 weight percent of layered clay exfoliated with organic quaternary ammonium salts having alkyl substituents, wherein at least one of the alkyl substituents carries an —$NH_2$ group, is used. In still another embodiment, from 0.4 to 0.6 weight percent, of layered clay exfoliated with organic quaternary ammonium salts having alkyl substituents, wherein at least one of the alkyl substituents carries an —$NH_2$ group, is used.

Once the prepolymer is produced, it may be used as a reaction product, together with a chain extender, to produce the desired polyurethanes of the present invention. Any chain extender capable of reacting with the prepolymer may be used. In at least one embodiment, the chain extender will react with the isocyanate to form prepolymer chains and form the polyurethane polymers. Examples of suitable chain extenders include 1,4-butane diol (BDO), 1,6-hexanediol (HDO), 1,6-haxamethylene diamine (HDA), and a hydrogen-accepting chain extenders (HACE). Such HACE chain extenders typically have a molecular weight of less than 1000 g/mol, and in one embodiment, may have a molecular weight of less than 700 g/mol. Typically, from about 0.1 to about 30 weight percent of a chain extender is used. In one embodiment, from about 2 to about 20 weight percent of a chain extender is used.

The resultant polyurethanes above have improved mechanical properties. Specifically, the polyurethanes have been found to have increased tensile, elongation and toughness as compared to polyurethanes not including any layered clay exfoliated with organic quaternary ammonium salts having alkyl substituents, wherein at least one of the alkyl substituents carries an —$NH_2$ group, as a reactant. That is, the polyurethanes exhibit increase mechanical properties as compared to unadulterated virgin polyurethanes.

In another embodiment of the present invention, polyurethanes may be made from the reaction product of a diol; a stoichiometric excess of diisocyanate; less than 1 weight percent, based upon the total polymer composition, of a layered clay exfoliated with organic quaternary ammonium salts having alkyl substituents, wherein at least one of the alkyl substituents carries an —$NH_2$ group and a chain extender. Any diol known and used in the art for the production of polyurethane may be used. Examples of such diols include PIB-based diols, such as HO-PIB-OH, or HO-PTMO-OH, or combinations of the two. In one embodiment, each diol has a molecular weight of at least 750 g/mol and more particularly, at least 1000 g/mol.

In another embodiment, polyurethanes may be made from the reaction product of a diamine; a stoichiometric excess of diisosyanate; less than 1 weight percent, based upon the total polymer composition, of a layered clay exfoliated with organic quaternary ammonium salts having alkyl substituents, wherein at least one of the alkyl substituents carries an —$NH_2$ group and a chain extender. Any diamine known and used in the art for the production of polyureas may be used. Examples of such diamines include PIB-based diamines such as $H_2N$-PIB-$NH_2$, or $H_2N$-PTMO-$NH_2$ or combinations of the two. In one embodiment, each diamine has a molecular weight of at least 750 g/mol and more particularly, at least 1000 g/mol.

In another embodiment, polyurethanes may be made from the reaction product of a diamine and a diol; a stoichiometric excess of diisocyanate; less than 1 weight percent, based upon the total polymer composition, of a layered clay exfoliated with organic quaternary ammonium salts having alkyl substituents, wherein at least one of the alkyl substituents carries an —$NH_2$ group and a chain extender. Any compound having a diamine and a diol known and used in the art in the production of polyurethane/polyureas may be used. Examples of such diamines and diols include PIB-based compounds such as HO-PIB-$NH_2$, or HO-PTMO-$NH_2$ or combinations of the two. In one embodiment, each diamine/diol compound has a molecular weight of at least 750 g/mol and more particularly, at least 1000 g/mol.

In all three main embodiments above related to polyurethanes, the polyurethane includes a stoichiometric excess of diisocyanate. That is, the molar ratio of diol/diamine to diisocyanate should be such that a little more diisocyanate is provided and remains in excess so as to ensure that the diisocyanates are left on the ends of the prepolymer. Any diisocyanate known and used in the art in the production of polyurethanes may be used. Examples of such diisocyanates include 4,4'-methylene diphenyl diisocyanate (MDI) and/or 4,4'-methylene dicyclohexyl diisocyanate (HMDI). Again, a stoichiometric excess of diisocyanate is used. However, typically and in one embodiment, from about 50 to about 25 weight percent, based upon the total polymer composition, of diisocyanate is used, while from about 50 to about 75 weight percent, based upon the total polymer composition, of diol, diamine or amine/alcohol end group compound is used. In other embodiments from about 35 to about 48 weight percent, based upon the total polymer composition, of diisocyanate is used, while from about 52 to about 65 weight percent, based upon the total polymer composition, of diol, diamine or amine/alcohol end group compound is used.

In all three embodiments related to the production of the polyurethane, a layered clay is used. The layered clay can be any layered clays known and used in the art that is suitable and known for increasing the mechanical properties of polymers, namely polyurethanes. Such layered clays can include 2:1 phyllosilicates-smectite groups. In one embodiment, the layered clays may be selected from montmorillonite, beidellite, nontronite, saponite, (F-)hectorite, stevensite, vermiculite, paragonite, clinochlore and thuringite. In another embodiment, the layered clay is montmorillonite.

In all three embodiments related to polyurethanes above, the layered clays are organically modified. That is, the layer clay is swelled and ultimately exfoliated with organic quaternary ammonium salts in which at least one of the longer alkyl substituents has an —$NH_2$ group, preferably an end group. One example of such an organic quaternary ammonium salt is trimethyl-1-propyl amine ammonium iodide. In one embodiment, the —$NH_2$ group is a primary amine. In another embodiment, the —$NH_2$ group is a secondary amine. In one embodiment, the longest alkyl substituent has from 4 to 10 carbon atoms. In another embodiment, the longest alkyl substituent may be straight, branched, or cyclic. In other embodiments, the shortest of the alkyl substituents have 1 to 4 carbon atoms. It will be appreciated that the organic quaternary ammonium salts are ionically or electrostatically bonded to the layered clays, since the clays are negatively charged and the salts are positively charged at the —$NR_3^+$ functionalities. In one or more embodiments, the layered clays are nanoclays, meaning that one dimension of the clay is in the nano range.

In one embodiment, from 0.001 to 0.9 weight percent of layered clay exfoliated with organic quaternary ammonium salts having alkyl substituents, wherein at least one of the alkyl substituents carries an —$NH_2$ group, is used. In another embodiment, from 0.01 to 0.8 weight percent of layered clay exfoliated with organic quaternary ammonium salts having alkyl substituents, wherein at least one of the alkyl substituents carries an —$NH_2$ group, is used. In yet another embodiment, from 0.1 to 0.7 weight percent of layered clay exfoliated with organic quaternary ammonium salts having alkyl substituents, wherein at least one of the alkyl substituents carries an —$NH_2$ group, is used. In still another embodiment, from 0.4 to 0.6 weight percent of layered clay exfoliated with organic quaternary ammonium salts having alkyl substituents, wherein at least one of the alkyl substituents carries an —$NH_2$ group, is used.

In all three embodiments above related to the polyurethane, a chain extender is used to produce the present invention. Any chain extender capable of reacting with the diisocyanate may be used. In at least one embodiment, the chain extender will react with the isocyanate to form polymer chains. Examples of suitable chain extenders include 1,4-butane diol (BDO), 1,6-hexanediol (HDO), 1,6-haxamethylene diamine (HDA), and a hydrogen-accepting chain extenders (HACE). Such HACE chain extenders typically have a molecular weight of less than 1000 g/mol, and in one embodiment, may have a molecular weight of less than 700 g/mol. Typically, from about 0.1 to about 30 weight percent of a chain extender is used. In one embodiment, from about 2 to about 20 weight percent of a chain extender is used.

The resultant polyurethanes above have improved mechanical properties. Specifically, the polyurethanes have been found to have increased tensile, elongation and toughness as compared to polyurethanes not including any layered clay exfoliated with organic quaternary ammonium salts having alkyl substituents, wherein at least one of the alkyl substituents carries an —$NH_2$ group, as a reactant. That is, the polyurethanes exhibit increased mechanical properties as compared to unadulterated virgin polyurethanes.

The following examples are exemplary in nature and the present invention is not necessarily limited thereto. Rather, as noted above, the present invention relates to the production of the various polyurethanes and polyurethane prepolymers having improved mechanical properties and a very small amount of an organically-modified layered clay.

In the following examples, the organically-modified layered clay (e.g., OmMMT) was prepared by reacting commercially available sodium montmorillonite ($Na^+MMT^-$) with quaternary ammonium salts of a tertiary amine carrying a —$NH_2$ functionality (for example, $I^-$ $N^+(CH_3)_3$ $CH_2CH_2CH_2NH_2$). The positively charged quaternary amine endgroup becomes electrostatically attached to negatively charged MMT layers and thereby defoliates it, whereas the free —$NH_2$ group reacts with diisocyanates and acts as an additional chain transfer agent used in the synthesis of polyurethanes. Thus, when OmMMT is added to a mixture of ingredients (i.e., diols, diisocyanates, and chain extenders) assembled for the synthesis of polyurethanes, this modified clay becomes an integral part of the polyurethane polymer. As an example for confirming improved mechanical properties, it has been found that the addition of about 0.5% MMT modified with $N^+(CH_3)_3CH_2CH_2CH_2NH_2$ to polyisobutylene (PIB)-based polyurethanes produces optically clear films with significantly enhanced tensile strength, elongation, toughness, and stress relaxation relative to that of unmodified PIB-Based polyurethanes.

EXPERIMENTAL

1. Preparation of OmMMT

The modifying agent $I^-+N(CH_3)_3$—$CH_2CH_2CH_2$—$NH_2$ was synthesized under N2 atmosphere by dissolving 25 g (0.2 mole) 3-dimethylamino-1-propyl amine (DMPA) available from Aldrich Chemical in Germany, in 40 mL THF/$H_2O$ (1:1) mixture and dropwise adding to this solution 15 mL (0.24 mole) methyl iodide ($CH_3I$), also available from Aldrich Chemical in Germany, at 0° C. The resultant precipitate formed after 2 hours was isolated by filtration. To ensure complete removal of iodide ions, the precipitate was washed repeatedly with THF and dried in vacuum at room temperature for 24 hours. The structure of the quaternary salt was confirmed by 1H NMR spectroscopy. The characteristic methyl protons appeared at δ 2.05 ppm in the spectrum of DMPA. The shift of this resonance to 3.05 ppm in the modifying agent indicated the presence of methyl protons attached to the tertiary N atom (N—$CH_3$).

Subsequently, 2 g NaMMT (Nanofil 1080, Sud Chemie, Germany, cationic exchange capacity 1000 meq/100 g) was dispersed in 200 mL THF/$H_2O$ (1:1) mixture and stirred vigorously. To the vigorously agitated clay dispersion was slowly added a solution of 1 g $I^-+N(CH_3)_3$—$CH_2CH_2CH_2$—$NH_2$ in 100 mL THF/$H_2O$ (1:1), the volume of the system was increased to 400 mL by the addition of THF/$H_2O$ (1:1), and the system stirred for 1 hour. The OmMMT was recovered by filtration, and the filter cake was repeatedly washed with THF/$H_2O$ (1:1) to remove excess ions. Finally the product was dried in a vacuum oven for 48 hours at 50° C.

Figure 2:
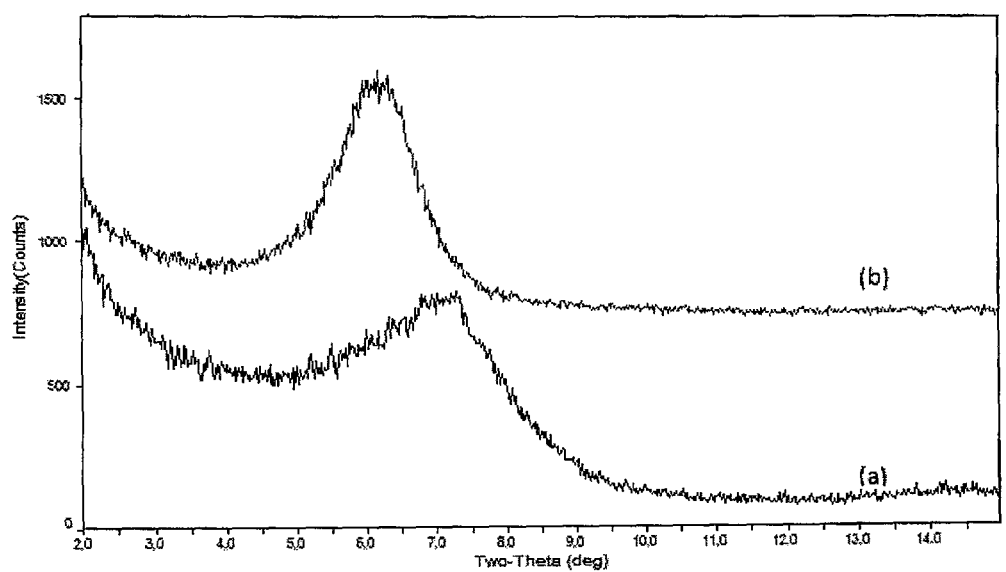
FIG. 2 is a graph showing the XRD diffractograms of (a) NaMMT and (b) OmMMT.

The schematic of FIG. 1 provides a representation of insertion of the quaternary ammonium salts into the galleries of the layered clay, MMT. The extent of insertion can be determined by XRD. The diffraction patterns of NaMMT and OmMMT are given in FIG. 2. The decrease of the diffraction angle (2θ), from 7.04° to 6.20°, corresponds to a spacing of NaMMT and OmMMT platelets of 1.24 and 1.35 nm, respectively and indicates the expansion of the galleries by the intercalation of the modifier.

2a. Preparation and Characterization of Polyurethane Containing 52% PIB Plus 12% PTMO Soft Co-Segments A representative polyurethane containing 52% polyisobutylene (PIB) and 12% poly(tetramethylene oxide) (PTMO) soft co-segments was prepared for comparison purposes. This composition was selected because it was previously found that the chemical incorporation of modest amounts of PTMO in PIB-based polyurethanes dramatically improves the mechanical properties, such as tensile strengths and elongations (~19.2 MPa and 230%, respectively). Moreover, in the presence of larger amounts of PIB (>60%), these polyurethanes were found to exhibit oxidative/hydrolytic/enzymatic stabilities far superior to commercially available polyurethanes.

0.8 g HO-PIB-OH (Mn=4000 g/mol) and 0.2 g HO-PTMO-OH (Mn=1000 g/mol) was dissolved in 3 mL dry THF, 0.440 g (1.6×10−3 moles) hydrogenated methylene diisocyanate (HMDI) and a drop of dibutyltinlaurate catalyst (0.5% in dry THF) was added under a blanket of $N_2$. The system was agitated 3 hours at 65° C. After 3 hours of stirring to allow for the formation of the prepolymer, 0.116 g (9.3×10-4 mole) of 1,6 hexanediol (HDO) was dissolved in 1 mL THF and added at 65° C. The solution was vigorously stirred for 16 hours. The highly viscous system was diluted with ~5 mL dry THF and poured in 7×7 cm Teflon molds. The solvent was slowly (~4 days) evaporated at room temperature, the films were further dried by heating at 60° C. in the mold for 2 days and by vacuum drying at 50° C. until weight constancy was reached. Finally the films were annealed by heating at 120° C. for 1 day.

Figure 3:
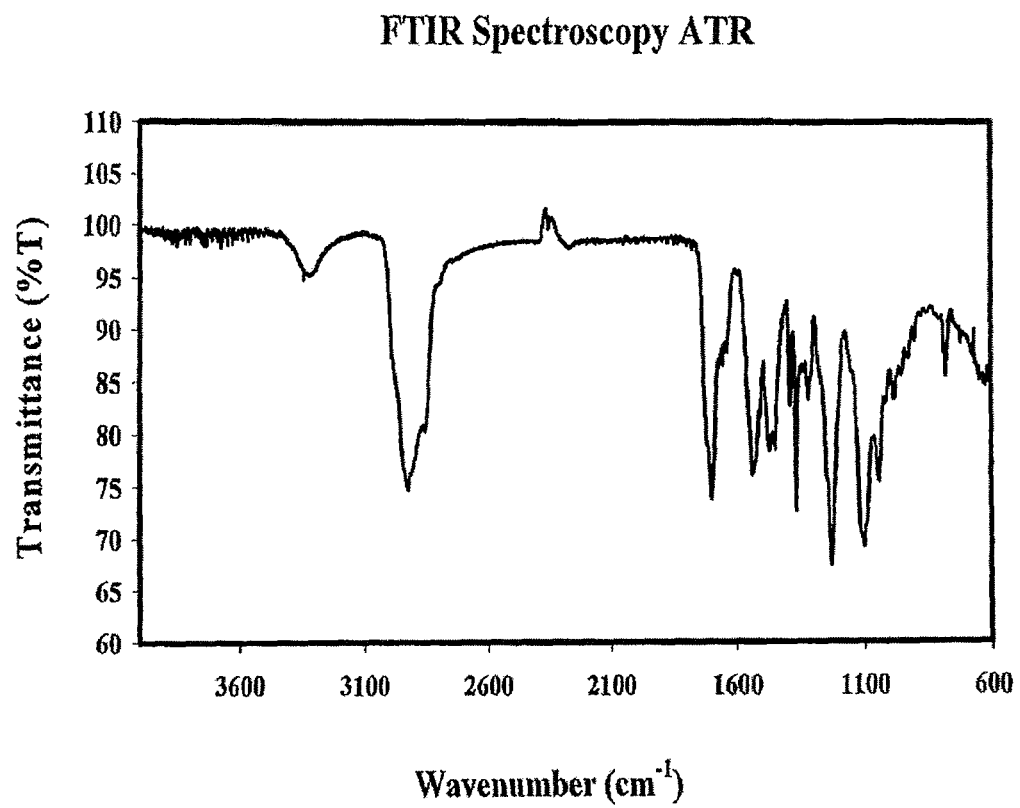
FIG. 3 is an FTIR spectrum of a comparison polyurethane containing 52% PIB and 12% PTMO soft co-segments.

The product was characterized by FTIR spectroscopy and GPC. The FTIR spectra, as shown in FIG. 3, was obtained by a Nicolet 7600 ATR instrument using thin solution cast films deposited on the crystal. Sixty four scans were taken for each spectrum with 2 $cm^{-1}$ resolution. The spectrum shows an absorption at 1699 $cm^{-1}$ typical of H bonded C═O urethanes. The absence of 1720 $cm^{-1}$ C═O band indicates the absence of free carbonyls. The 3330 $cm^{-1}$ absorption indicates that essentially all the NH groups are H bonded. The absence of absorption at 3480 $cm^{-1}$ indicates that the NH groups are completely H bonded. The absence of the 2225 $cm^{-1}$ peak indicates that the reaction was complete.

GPC chromatograms were obtained with a Waters instrument equipped with Styragel Columns (HR 0.5, HR 1, HR 3, HR 4, HR 5, HR 6) and a refractive index detector (Optilab Wyatt Technology). Samples were dissolved in THF and the flow rate was 1 mL THF/min. Molecular weights were calculated by using polystyrene calibration standards. The GPC indicated a shift of the monomodal peak from MW=4200 to 50,200 g/mol, which is consistent with the formation of high molecular weight polyurethane.

2b. Preparation of a Polyurethane Nanocomposite Containing 52% PIB and 12% PTMO Soft Co-Segments The preparation of this nanocomposite was carried out by using the same ingredients, amounts and procedure described in Example 2a, except with additional OmMMT. Since $NH_2$ groups will react with the NCO groups of HMDI to give urea linkages, the stoichiometry was arranged so that approximately half of HMDI was previously reacted with OmMMT. Thus, a mixture of 0.0078 g of OmMMT (0.5% loading) in 2 mL THF and 0.220 g (0.8×10−3 moles) of HMDI was first ultra-sonicated for 2 hours before addition to prepolymer solution. Two more compositions were prepared by using 0.0156 g and 0.078 g OmMMT (which provide approximately 1% and 5% loading, for the polyurethane nanocomposites.

Figure 4:
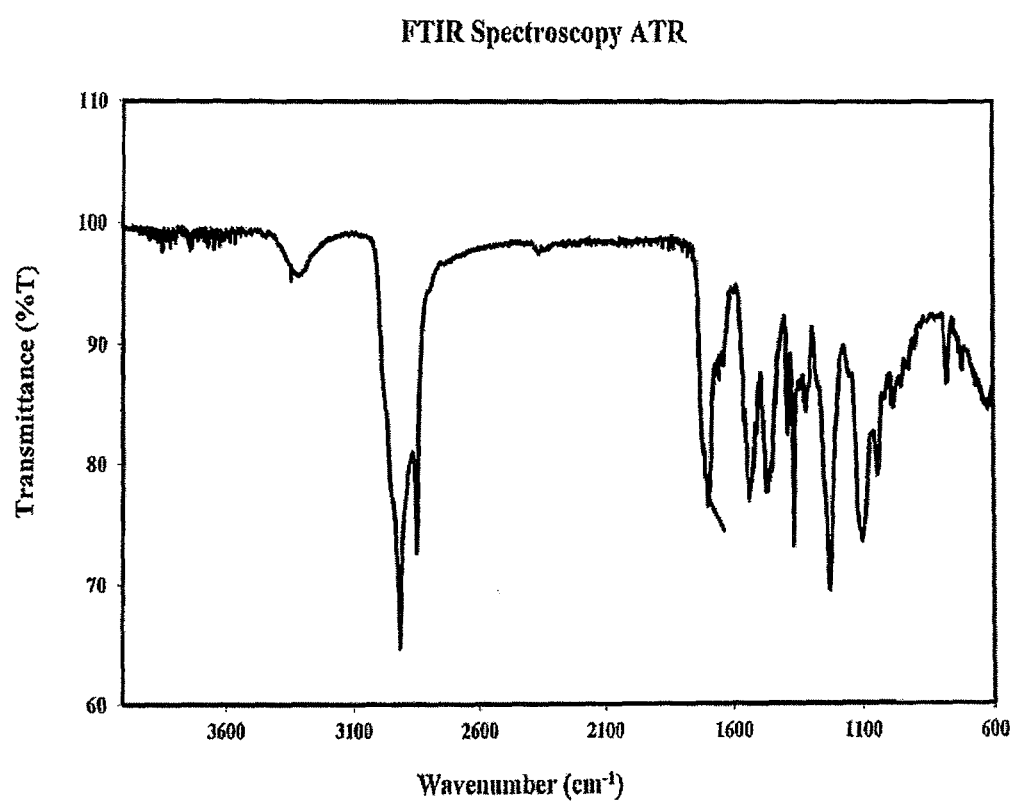
FIG. 4 is a FTIR Spectrum of the polyurethane nanocomposite of the present invention with 0.5% OmMMT containing 52% PIB and 12% PTMO soft co-segments.

FIG. 4 shows a representative spectrum of the nanocomposite. According to this spectrum the positions and intensities of the absorptions are essentially identical to those observed of the virgin polyurethane (FIG. 3), indicating that the overall chemical structure of the polyurethane did not change by the presence of 0.5% OmMMT.

3a. Preparation of Virgin Polyurethane with 64% PIB Soft Segment

This polyurethane composition was selected because according to previous work, polyurethane containing >60% PIB exhibits unprecedented oxidative stability. The synthesis of this control sample was carried out by the procedure described in Example 2a except in the absence of PTMO. The molecular structure of this sample was analyzed by FTIR spectroscopy and GPC. The data obtained showed that the product was essentially the same as previous compositions (Example 2a).

3b. Preparation of a Polyurethane Nanocomposite Containing 64% PIB

The synthesis of this polyurethane nanocomposite was carried out by the procedure described in Experiment 3a except 0.0078 g (0.5%) OmMMT was added to the starting ingredients described in Example 2b. FTIR and GPC characterization of the nanocomposite showed that the product the identical results with previously given compositions (Example 2b).

4. Preparation of a Polyurethane Nanocomposite Containing 64% PIB in the Presence of Glycerin This experiment was designed for the preparation of PIB-based polyurethanes and their nanocomposites by using a HO-PIB-OH whose —OH concentration was 15% less than the theoretical 2.0. This deficiency was thought to be compensated by using glycerin, a molecule with three —OH functionalities. It was further expected that this branched molecule would reduce the viscosity of the system by shear thinning. The syntheses of the nanocomposites containing 64% PIB in the absence and presence of glycerin were carried out by the procedure described in Example 3a and 3b, respectively. The amount of glycerin was calculated according to the following formula:

$$G = P \times 2/3 \times 0.15$$

where G=moles of glycerin, P=moles of PIB, and 0.15 indicates the deficiency of OH functionality. Thus, 2.3 mg (2.5×10-5 moles) of glycerin was used in the recipe given in Examples 3a and 3b. The addition of glycerin was found to produce well dispersed OmMMT in the prepolymer. Thus HO-PIB-OH and OmMMT were first mixed for 24 hours at room temperature then the glycerin was added. At each stage of the synthesis the solution remained transparent and the polymer was completely soluble (no gel) FTIR and GPC characterization indicated that the nanocomposite was identical to previous compositions (Example 2b).

5. Preparation of a Nanocomposite Polyurethane Containing 70% PIB in Solution Among the possible preparation methods of nanocomposites (in-situ, solution, melt), the solution method is known to be the easiest (but less efficient one). This technique involves a simple physical mixing of polymer solution and silicate dispersion. Since the relatively weak Van der Waals interactions determine the dispersion's success, in order to have meaningful mechanical performance, relatively high loadings (up to 30%, as in conventional composites) are necessary. In this experiment, the effect of OmMMT on performance of polyurethane nanocomposites prepared by the solution method was explored.

2 g of a previously prepared polyurethane sample containing 70% PIB and 0.010 g (0.5%) OmMMT were placed in 8 mL dry THF. The mixture was stirred for 2 days at room temperature and subsequently was sonicated for 2 hours to remove trapped gases. Subsequently, the viscous solution was poured in 7×7 cm Teflon molds, the THF was slowly (~4 days) evaporated at room temperature, the film was dried by heating at 60° C. in the mold for 2 days, and vacuum dried at 50° C. until weight constancy. Finally, the film was annealed by heating to 120° C. for 1 day.

6. Physical Properties of Polyurethanes and Nanocomposites

A. Chemical Incorporation of OmMMT in Polyurethane

The chemical incorporation of exfoliated OmMMT layers into polyurethane was analyzed by Messersmith and Gianielli's reverse ion exchange technique as set forth in *J. Polym. Sci.*, Part A: Polym. Chem., 33, 1047, (1995), the disclosure of which is incorporated herein by reference. According to this technique, reverse ion exchange by use of LiCl can be used to separate bound polymer from the inorganic portion of the nanocomposite. Thus, in a 50 mL flask equipped with a magnetic stirrer, 0.2 g of a nanocomposite of polyurethane containing 52% PIB and 12% PTMO soft co-segments was dissolved in 2 mL THF and stirred for 2 hours at room temperature. Separately, a stock solution of 1% LiCl in THF was prepared and the nanocomposite solution was added dropwise to 4 mL of LiCl stock solution, and stirred for 48 hours at room temperature. The resultant opaque solution was centrifuged at 3000 rpm for 5 min, the almost clear supernatant solution was decanted, and the solid residue was washed twice with THF. The supernatant was precipitated into a large excess (50 mL) of methanol, the white powdery solid was filtered off and dried in vacuum for 24 hours at room temperature. To determine the amount of polyurethane recovered, attempts were made to filter sample solutions; however, these attempts failed because the samples clogged the filter. The fact that the samples could not be filtered is direct evidence of the incorporation in and bonding of OmMMT to the polyurethane.

B. Thermal Properties

Figure 5A:
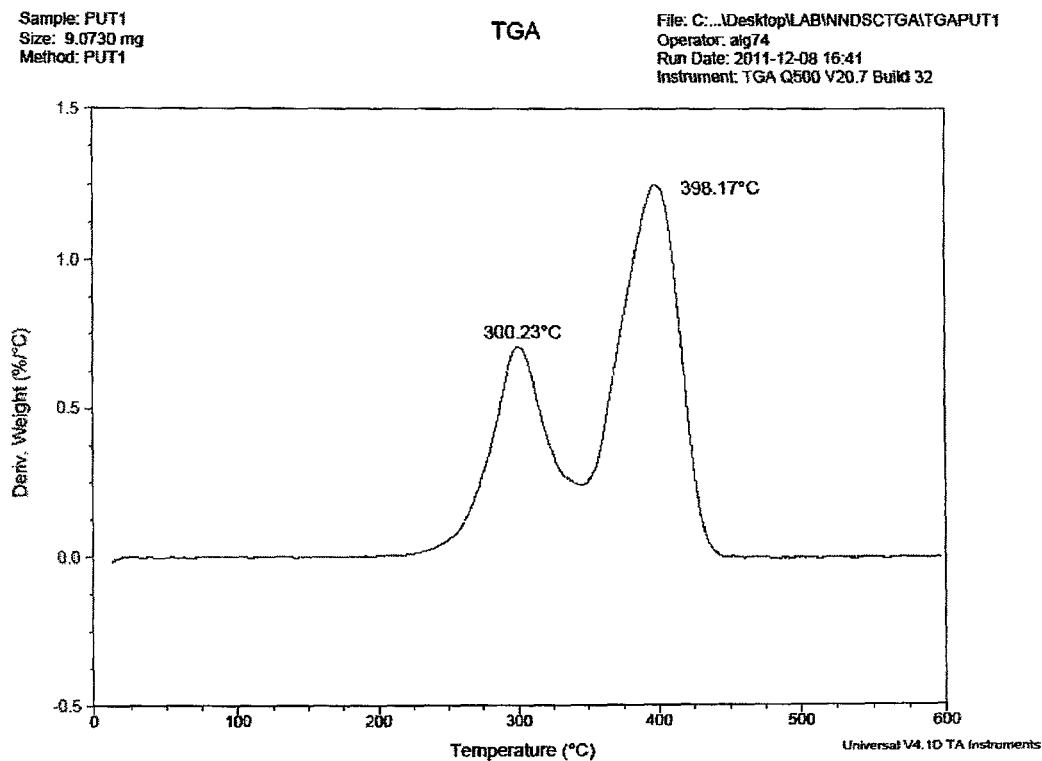
FIG. 5a is a TGA thermogram of a polyurethane containing 52% PIB and 12% PTMO soft co-segments.
Figure 5B:
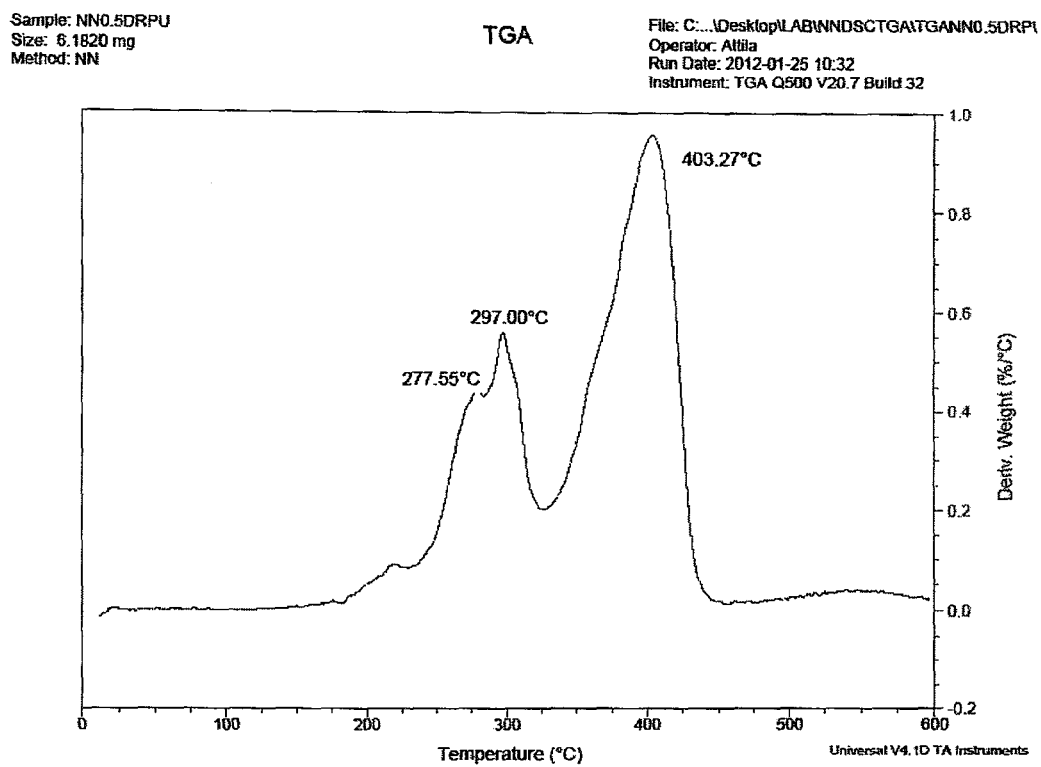
FIG. 5b is a TGA thermogram of a polyurethane nanocomposite of the present invention with 0.5% OmMMT and containing 52% PIB and 12% PTMO soft co-segments.

The thermal stability of representative polyurethane and nanocomposite samples were analyzed by thermal gravimetric analysis (TGA) using a TA Instruments Q500 TGA. FIGS. 5a and 5b show the TGA traces of the products obtained by the procedures described in Examples 2a and 2b. The TGA runs were carried out with ~8 mg samples heated from 20 to 600° C. at a heating rate of 10° C./min under $N_2$.

The thermal degradation of polyurethane occurs in two stages: the first stage is dominated by the degradation of hard segments (e.g., diisocyanates), while the second stage is associated with the cleavage of the soft segments (e.g., polyisobutylenes). FIG. 5a shows these peak temperatures during the first and second degradation stages.

The existence of multiple degradation temperatures of the hard phase indicates the formation of strong urea linkages between NCO and $NH_2$ groups of the diisocyanate and OmMMT, respectively, resulting in multiple degradation mechanisms. The slight increase in the degradation temperature (~4° C.) of the soft phase may be due to experimental variation.

C. Thermal Transitions

Figure 6A:
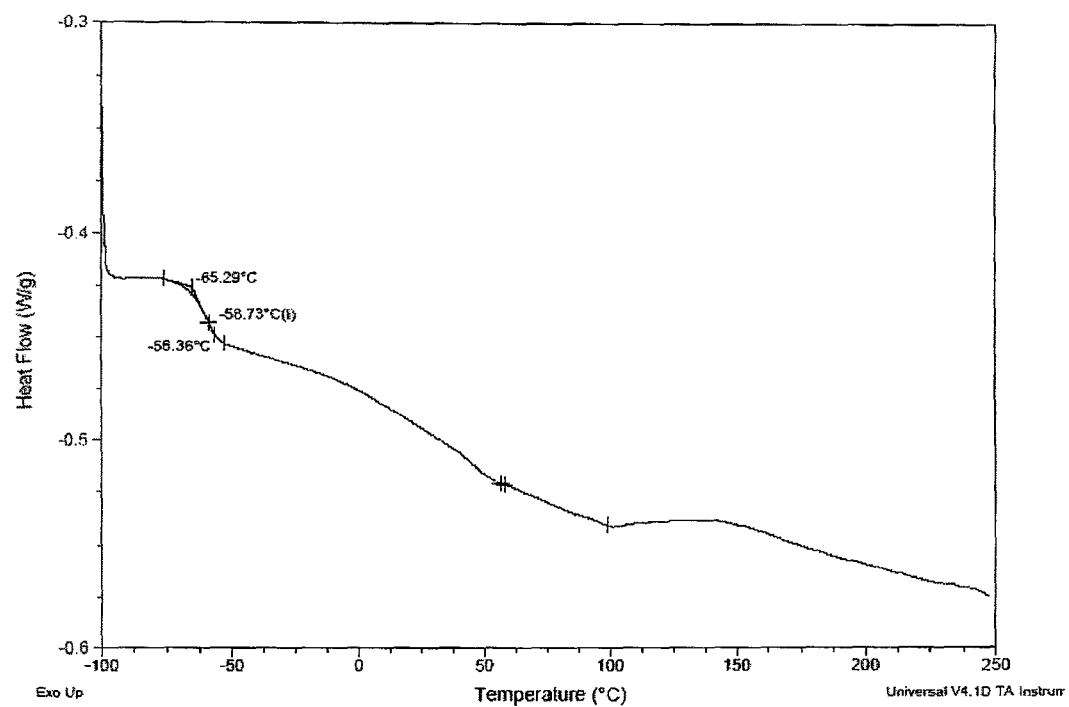
FIG. 6a is a DSC thermogram of a polyurethane containing 52% PIB and 12% PTMO soft co-segments.
Figure 6B:
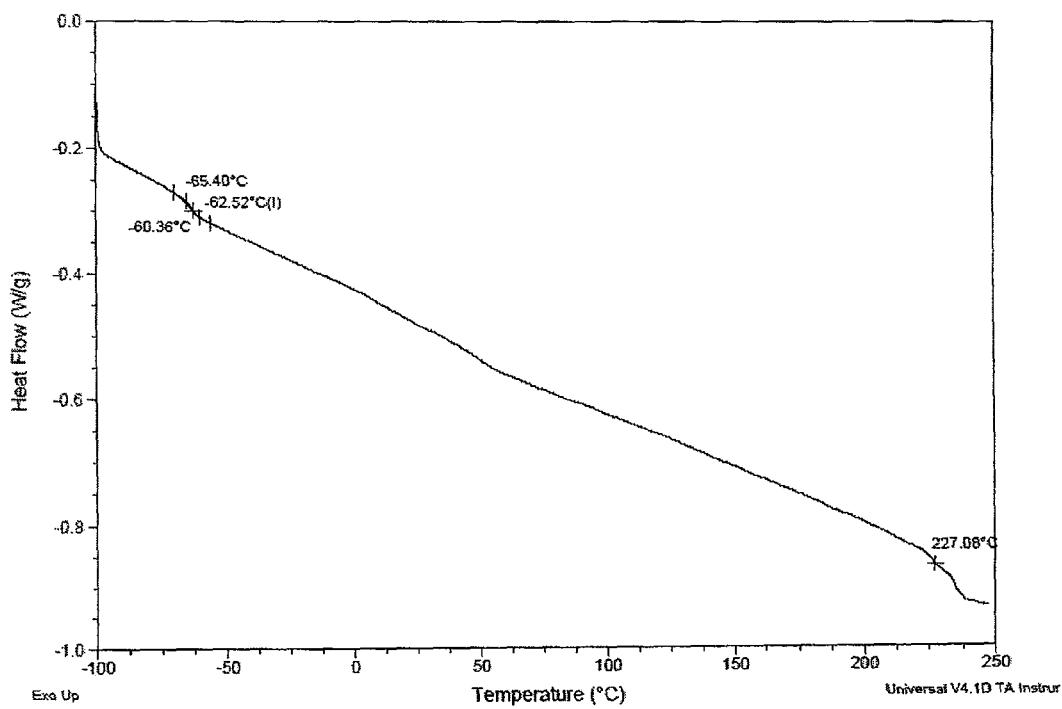
FIG. 6b is a DSC thermogram of a polyurethane nanocomposite of the present invention with 0.5% OmMMT and containing 52% PIB and 12% PTMO soft co-segments.

The evaluation of thermal transitions provides valuable insight into the structure of polymeric materials. FIGS. 6a and 6b show DSC traces of virgin polyurethane containing 52% PIB and 12% PTMO soft co-segments, and the same polyurethane containing 0.5% OmMMT. The traces were obtained with a TA Instruments Q2000 DSC. Five –10 mg samples enclosed in aluminum pans were heated 10° C./min from 100 to 250° C. The DSC thermogram of the virgin polyurethane in FIG. 6a shows the expected two main transitions: the glass transition temperature of the PIB soft phase at –58° C., and that of the hard phase at 55-65° C. Significantly, the DSC trace of the nanocomposite (FIG. 6b) shows a much lower Tg (–62° C.) for the soft phase, as well as several intermediate high temperature endotherms. Previous studies have shown that PTMO addition reduces the intensity of hard phase endothermic peak by disturbing the hydrogen bonded structures within the hard segments. The diffuse interphase between the hard and soft segments facilitates stress transfer from the continuous soft phase to the dispersed hard phase, and enhances the mechanical properties of polyurethanes. In the present instance, the existence of multiple endotherms is likely due to the formation of various hydrogen bonded structures in the hard phase by reaction of isocyanates with either —OH or —$NH_2$ groups on the surface of OmMMT. These results are in good agreement with the multiple degradation mechanisms of the hard phase observed by TGA (see FIG. 5b). The small crystalline melting peak at ~220° C. may be attributed to the formation of urea linkages due to —NH2 groups on OmMMT and isocyanates. In sum, it is evident that, in the presence of OmMMT, a variety of strong interactions between phases occur, which result in diffused interphases and, consequently, improved mechanical properties.

D. Dispersion of the Organophilic Clay in a Polyurethane Matrix

The dispersion of the organophilic layered clay (OmMMT) in a polyurethane matrix was investigated by XRD analyses. XRD patterns of compositions with varying amounts of organoclay loadings are shown in FIG. 7. According to the XRD patterns, only the polyurethane nanocomposites having 0.5 OmMMT shows the absence of the d 001 diffraction peak of OmMMT (see circled area in FIG. 7), which demonstrates complete delamination or exfoliation of silica layers of the polyurethane matrix. In the samples containing 1 to 5% loadings of OmMMT, the original position of the OmMMT peak broadened, which indicates a measure of intercalation of polyurethane chains between galleries. Without being bound to theory, it is believed that the interaction of the —$NH_2$ groups of the intercalant leads to urea bonds, which in turn leads to complete exfoliation. But at higher loadings, interaction between the intercalant and the edge/surface —OH groups of the layers most probably result in the exclusion of the chains from the galleries giving rise to intercalation only.

7. Mechanical Properties

Table I shows mechanical property data of a representative virgin polyurethane and polyurethane nanocomposites formed of essentially the same polyurethane but with various amounts of OmMMT added.

TABLE I

Mechanical Property Data of Various Polyurethane Nanocomposites

| No | SAMPLES* | Tensile Strength MPa | Elongation at Break % | Elastic Modulus MPa | Toughness J |
|---|---|---|---|---|---|
| 1 | HO—PIB—OH(4k-52%) + HO—PTMO—OH(1K-12%)HMDI + HDO = 36% | 34 | 360 | 32 | 1.16 |
| 2 | HO—PIB—OH(4k-52%) + HO—PTMO—OH(1K-12%)HMDI+HDO = 36% + N0.5% | 38 | 460 | 19 | 2.13 |
| 3 | HO—PIB—OH(4k-52%) + HO—PTMO—OH(1K-12%)HMDI + HDO = 36% + N1% | 14 | 228 | 20 | 0.22 |
| 4 | HO—PIB—OH(4k-52%) + HO—PTMO—OH(1K-12%)HMDI + HDO = 36% + N2% | 12 | 147 | 40 | 0.16 |
| 5 | HO—PIB—OH(4k-52%) + HO—PTMO—OH(1K-12%)HMDI + HDO = 36% + N5% | 15 | 130 | 55 | 0.14 |
| 6 | HO—PIB—OH(4k-64%) HMDI + HDO = 36% | 14 | 320 | 12 | 0.68 |
| 7 | HO—PIB—OH(4k-64%) HMDI + HDO = 36% + N0.5% | 24 | 400 | 15 | 1.04 |
| 8 | HO—PIB—OH(4k-70%)HMDI + HDO = 30% | 17 | 480 | — | — |

TABLE I-continued

Mechanical Property Data of Various Polyurethane Nanocomposites

| No | SAMPLES* | Tensile Strength MPa | Elongation at Break % | Elastic Modulus MPa | Toughness J |
|----|----------|----------------------|------------------------|---------------------|-------------|
| 9 | HO—PIB—OH(4k-70%)HMDI + HDQ = 30% + N0.5 in sol | 19 | 588 | 9.2 | 2.90 |

*The abbreviations of the samples are generally set forth in the description above. The presence of OmMMT in the nanocomposite is indicated by N, followed by a number indicating the wt % of OmMMT.

The examination of the data suggests a strong beneficial effect of OmMMT on the mechanical properties of PIB-based polyurethanes. Specifically, a comparison of properties of virgin PIB-based polyurethanes (controls) of various compositions with polyurethanes of the same composition but containing 0.5% OmMMT (i.e., comparison of samples 1 with 2; samples 6 with 7; and samples 8 with 9) indicates that a surprisingly small amount of OmMMT significantly enhances mechanical properties. It has also been found that a very small amount of OmMMT (less than 1%) changes the organization of hard domains due to the presence of active functional groups.

Also as shown in Table I above, experiments were carried out to explore the effect of various amounts of OmMMT on mechanical properties (Samples 1-5). Unexpectedly, the improvement was obtained with the lowest amount, 0.5% of OmMMT, while 1.0, 2.0 and 5.0% OmMMT precipitously decreased the properties. It is of considerable practical interest that the addition of 0.5% OmMMT to PIB-based polyurethane containing 64 and 70% PIB (Samples 6 and 8) (i.e., polyurethanes that exhibit unparalleled oxidative and hydrolytic stability), considerably increases ultimate tensile strength and elongation (Samples 7 and 9).

The beneficial effect of OmMMT on the tensile strength, elongation and toughness is apparent whether the synthesis is carried out by the in situ technique or in solution. (Samples 8 and 9). The increase in toughness is of particular interest since highly tough materials are effective vibration dampers. It is also of interest that all the samples containing OmMMT were optically clear.

It is also well known that damping is closely related to the tan δ values. The tan δ of soft phase relaxation at low temperature does not change much whereas that of hard ones at higher temperature increases in nanolayer addition. In the presence of 0.5% OmMMT, tan δ shows a maximum, doubling from 0.1 to 0.2. Without being bound by theory, this may be due to changes that occur mainly in the hard domains, and that 0.5% OmMMT lead to a harder material.

High damping (i.e., high tan δ) is in line with the high toughness found by mechanical testing (see Table I).

8. Time Dependent Properties

A. Stress Relaxation Properties

The stress relaxation of a representative virgin polyurethane and the same polyurethane containing 0.5% OmMMT (Samples 1 and 2, Table I) was determined. Stress relaxation is a process of reorganization of a structure to reach the thermodynamic equilibrium after a perturbation. Stress relaxation and creep (which follows) are both closely related to the uncoiling/disentangling of soft/rubbery materials, and yield essentially identical data in regard to the time dependent deformation of viscoelastic materials.

In a stress relaxation experiment, the tested material is exposed to a constant strain and the time necessary to release the initial stress is determined. By definition, the relaxation time is the time required for the stress to decrease to 36.8% of its initial value.

Stress relaxation experiments were carried out by using a TA Dynamic Mechanical Analyzer (RSA3) at 1% strain amplitude. Table II provides stress relaxation times of a polyurethane in the absence and the presence of 0.5% OmMMT.

TABLE II

Representative Stress Relaxation Data for Polyurethanes and Nanocomposites

| No | SAMPLES * | Initial time Min. | Initial Stress × $10^5$ Pa | Stress × $10^5$ Pa | Time Min. | Relaxation Time Min. |
|----|-----------|-------------------|----------------------------|--------------------|-----------|----------------------|
| 1 | HO-PIB-OH(4k-52%)+HO-PTMO-OH(1K-12%)HMDI+HDO = 36% | 0.001 | 2.00 | 1.26 | 0.12 | 0.12 |
| 2 | HO-PIB-OH(4k-52%)+HO-PTMO-OH(1K-12%)HMDI+HDO = 36%+N0.5% | 0.001 | 1.46 | 0.92 | 0.23 | 0.23 |

The relaxation time of 0.5% OmMMT-modified polyurethane is almost double that of the virgin polyurethane (control). Without being bound by theory, it is believed that the addition of a very small amount of OmMMT enhances the degree of microphase separation. In other words, by decreasing the hard segment content, the flexibility of the soft phase increases, which leads to lower relaxation.

B. Creep

Creep is another time dependent plastic deformation that takes place under stresses lower than the yielding stress. Low stress relaxation rate indicates low creep, while high relaxation rates indicate high creep.

In conducting tests of tensile creep compliane versus test duration under a constant creep stress of 1 MPa at room temperature for the samples, the PIB-based polyurethanes exhibited a relatively high compliance. In contrast, the 0.5% OmMMT significantly reduced creep strain at this loading. This nanocomposite exhibited a much lower initial creep rate and very high dimensional stability. Thus, a very small amount (i.e., less than 1%) of OmMMT not only reduces creep strain, but also decreases the amount of permanent deformation caused by the applied constant load for a long time.

9. Chemical and Morphological Considerations

Figure 7A:
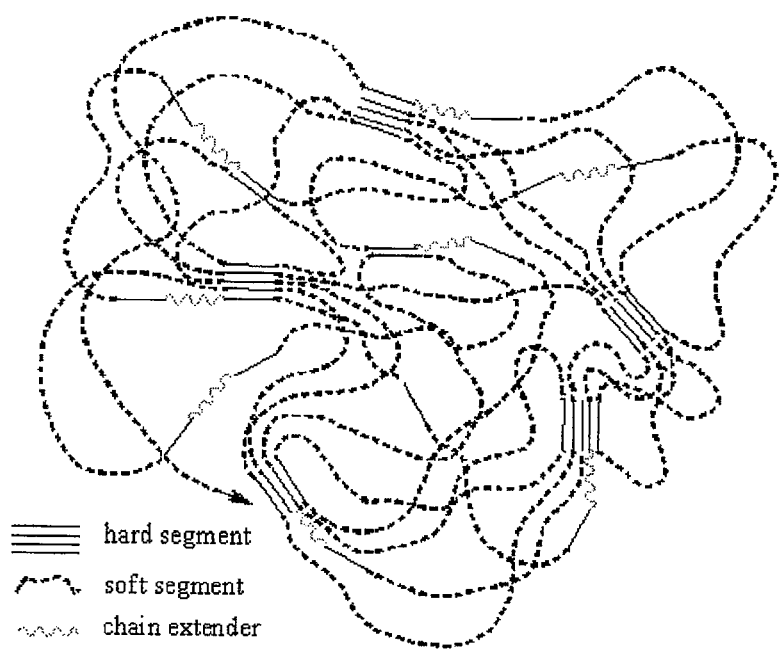
FIG. 7a is a schematic representation of an idealized morphology of virgin polyurethane.
Figure 7B:
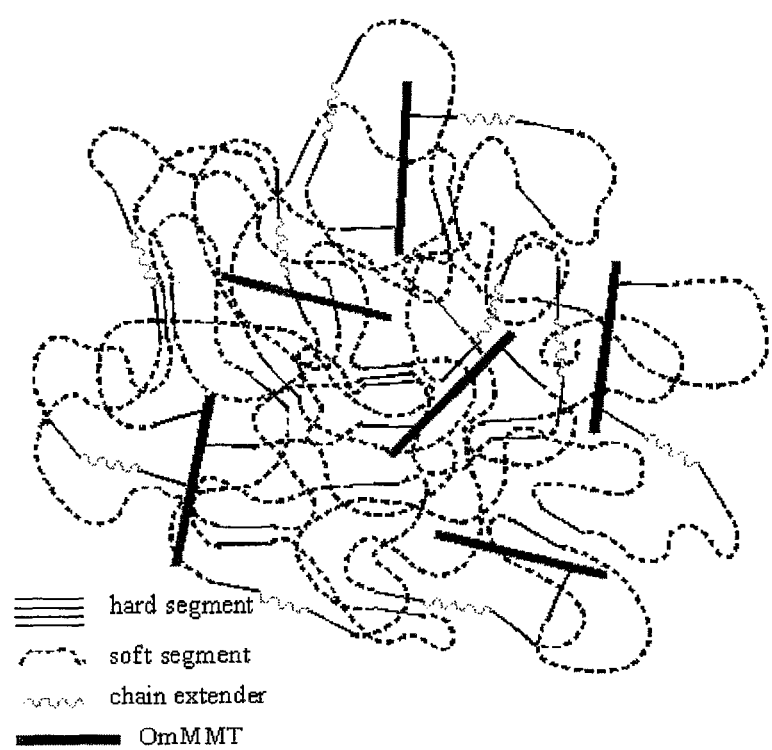
FIG. 7b is a schematic representation of an idealized morphology of polyurethane containing OmMMT.

The observations described in this disclosure may be explained by the changes in morphology of the novel nanocomposite. FIGS. 7a and 7b show the idealized morphologies of a virgin PU and PU containing OmMMT.

The virgin polyurethane contains crystalline (or semicrystalline) hard domains dispersed in the continuous soft domain, whereas the nanocomposite comprises exfoliated OmMMT nano-sheets chemically (covalently and ionically) bound to the polyurethane structure. The quaternary amine group of the modifier is ionically bound to layered clay nano-sheets, and the —NH2 group of the modifier reacts with the diisocyanate prepolymer. In contrast to the conventional structure of virgin polyurethane (FIG. 7a), the nanocomposite (FIG. 7b) contains smaller and more dispersed hard domains. The increased amount of interphases is expected to result in more homogeneous stress distribution leading to improved mechanical performance.

Figure 8:
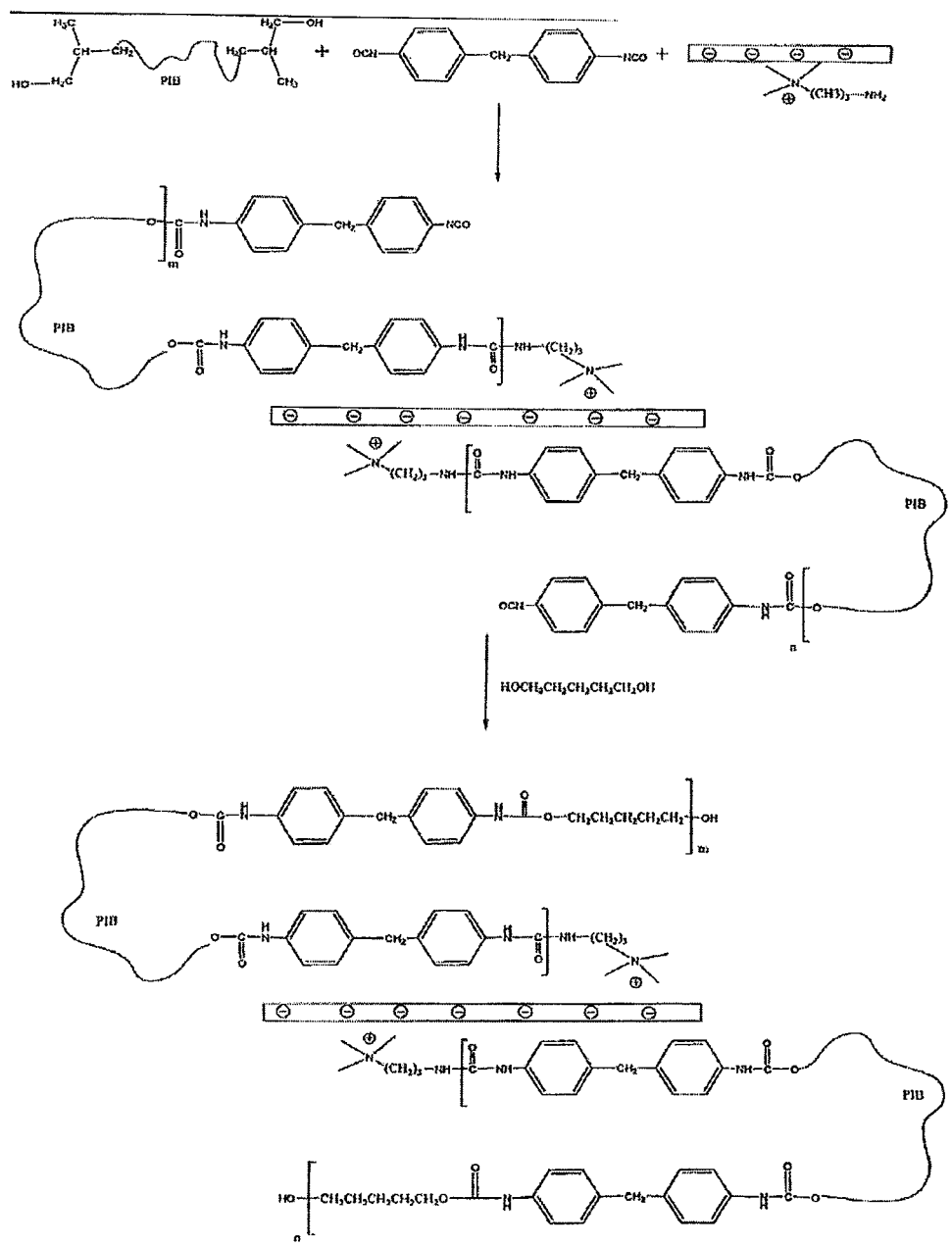
FIG. 8 is a synthesis scheme for the production of PIB-based polyurethane nanocomposites of the present invention.

FIG. 8 outlines the chemical reactions that occur during synthesis (involving the PIB diol, diisocyanate and chain extender) in the presence of organically-modified layered clay. The synthesis involves the formation of the prepolymer (a diisocyanate), which undergoes chain extension with the conventional chain extender and the OmMMT, which acts as a —NH2 containing chain extender. The latter, in conjunction with the diisocyanate prepolymer, produces strong urea linkages. In this manner, the OmMMT moiety can be chemically bound to the hard segment and becomes an integral part of the polyurethane molecule. The well-dispersed OmMMT nano-sheets contribute to the strength of the final construct. Increased elongation may be due to the plasticizing effect exerted by the quaternary alkyl moiety.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A polyurethane prepolymer comprising the reaction product of:
   (a) a polyisobutylene-diol and/or a polyisobutylene-diamine;
   (b) a stoichiometric excess amount of diisocyanate; and
   (c) from 0.001 to 0.9 weight percent, based upon the total polymer composition, of a layered clay exfoliated with trimethyl-1-propyl amine ammonium iodide.

2. The polyurethane prepolymer of claim 1, wherein each diol has a molecular weight of at least 1000 g/mol.

3. The polyurethane prepolymer of claim 1, wherein each diamine has a molecular weight of at least 1000 g/mol.

4. The polyurethane prepolymer of claim 1, wherein the diisocyanate is selected from the group consisting of 4,4'-methylene diphenyl diisocyanate (MDI) and/or 4,4'-methylene dicyclohexyl diisocyanate (HMDI).

5. The polyurethane prepolymer of claim 1, wherein the layered clay is selected from the group consisting of 2:1 phyllosilicates-smectite groups, montmorillonite, beidellite, nontronite, saponite, (F-)hectorite, stevensite, vermiculite, paragonite, clinochlore and thuringite.

6. The polyurethane prepolymer of claim 1, wherein from 0.01 to 0.8 weight percent of layered clay exfoliated with trimethyl-1-propyl amine ammonium iodide, is used.

7. The polyurethane prepolymer of claim 6, wherein from 0.1 to 0.7 weight percent of layered clay exfoliated with trimethyl-1-propyl amine ammonium iodide, is used.

8. The polyurethane prepolymer of claim 7, wherein from 0.4 to 0.6 weight percent of layered clay exfoliated with trimethyl-1-propyl amine ammonium iodide, is used.

9. A polyurethane comprising the reaction product of:
   (1) a polyurethane prepolymer according to claim 1; and
   (2) a chain extender.

10. The polyurethane of claim 9, wherein the chain extender is selected from the group consisting of HDO, BDO, HDA and a hydrogen-accepting chain extender (HACE).

11. The polyurethane of claim 9, having increased tensile, elongation and toughness as compared to a polyurethane not including any layered clay exfoliated with trimethyl-1-propyl amine ammonium iodide, as a reactant.

12. A medical device containing the polyurethane of claim 9.

13. A polyurethane comprising the reaction product of:
   (a) a polyisobutylene-diol and/or a polyisobutylene-diamine;
   (b) a stoichiometric excess amount of diisocyanate;
   (c) from 0.001 to 0.9 weight percent, based upon the total polymer composition, of a layered clay exfoliated with trimethyl-1-propyl amine ammonium iodide; and
   (d) a chain extender.

14. The polyurethane of claim 13, wherein each diol has a molecular weight of at least 1000 g/mol.

15. The polyurethane of claim 13, each diamine has a molecular weight of at least 1000 g/mol.

16. The polyurethane of claim 13, wherein the diisocyanate is selected from the group consisting of 4,4'-methylene diphenyl diisocyanate (MDI) and/or 4,4'-methylene dicyclohexyl diisocyanate (HMDI).

17. The polyurethane of claim 13, wherein the layered clay is selected from the group consisting of 2:1 phyllosilicates-smectite groups, montmorillonite, beidellite, nontronite, saponite, (F-)hectorite, stevensite, vermiculite, paragonite, clinochlore and thuringite.

18. The polyurethane of claim 13, wherein from 0.01 to 0.8 weight percent of layered clay exfoliated with trimethyl-1-propyl amine ammonium iodide, is used.

19. The polyurethane of claim 18, wherein from 0.1 to 0.7 weight percent of layered clay exfoliated with trimethyl-1-propyl amine ammonium iodide, is used.

20. The polyurethane of claim 19, wherein from 0.4 to 0.6 weight percent of layered clay exfoliated with trimethyl-1-propyl amine ammonium iodide, is used.

21. The polyurethane of claim 13, wherein the chain extender is selected from the group consisting of HDO, BDO, HDA and a hydrogen-accepting chain extender (HACE).

22. The polyurethane of claim 13, having increased tensile, elongation and toughness as compared to a polyurethane not including any layered clay exfoliated with trimethyl-1-propyl amine ammonium iodide, as a reactant.

23. A medical device containing the polyurethane of claim 13.

* * * * *